(12) United States Patent
Andrews et al.

(10) Patent No.: US 6,917,297 B2
(45) Date of Patent: Jul. 12, 2005

(54) SYSTEM AND METHOD FOR ADVANCE WARNING OF SEVERE WEATHER FOR GENERAL AVIATION AIRCRAFT

(75) Inventors: James Neal Andrews, Austin, TX (US); David Bruce Kumhyr, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 62 days.

(21) Appl. No.: 10/455,175

(22) Filed: Jun. 5, 2003

(65) Prior Publication Data

US 2004/0246145 A1 Dec. 9, 2004

(51) Int. Cl.[7] ................................................ G01W 1/00
(52) U.S. Cl. ............... 340/601; 340/539.13; 340/539.2; 340/539.28; 340/678; 340/977; 701/9; 73/182
(58) Field of Search ......................... 340/539.13, 539.2, 340/539.22, 539.28, 601, 678, 970, 977, 968, 949; 701/4, 9, 10; 73/179, 182, 170.11

(56) References Cited

U.S. PATENT DOCUMENTS

| | | | | |
|---|---|---|---|---|
| 5,654,700 A | * | 8/1997 | Prata et al. .................. 340/963 |
| 6,020,832 A | * | 2/2000 | Jensen ......................... 340/970 |
| 6,043,756 A | * | 3/2000 | Bateman et al. ............. 340/945 |
| 6,317,690 B1 | * | 11/2001 | Gia .............................. 701/301 |
| 6,381,538 B1 | * | 4/2002 | Robinson et al. ........... 701/211 |
| 6,584,384 B2 | * | 6/2003 | Gremmert et al. ............. 701/4 |
| 6,732,022 B2 | * | 5/2004 | Mardirossian ................. 701/3 |
| 6,735,542 B1 | * | 5/2004 | Burgett et al. ................ 702/85 |

* cited by examiner

*Primary Examiner*—Daniel Wu
*Assistant Examiner*—Travis R Hunnings
(74) *Attorney, Agent, or Firm*—Van Leeuwen & Van Leeuwen; Joseph T. Van Leeuwen; Jeffrey S. LaBaw

(57) ABSTRACT

A system and method for advanced warning of severe weather for general aviation aircraft is presented. An aircraft includes an onboard weather tracker which monitors atmospheric condition changes. The weather tracker uses data from an onboard barometric altimeter and a GPS device to calculate air pressure changes in order to identify when the aircraft is flying into a low-pressure zone. The weather tracker uses the air pressure's rate of change and the aircraft's speed to determine the criticality of a situation and appropriately notifies a pilot. The weather tracker provides the pilot with local airport information and alternative flight pattern information per the pilot's request.

30 Claims, 10 Drawing Sheets

200

| Time | GPS Altitude Data (ft) | Altimeter Measurement (ft) | Pressure (in. Hg) | Pressure Change (in. Hg) | Altitude Change |
|---|---|---|---|---|---|
| 12:00 | 300 | 300 | 29.92 | 0 | 0 |
| 12:30 | 10,000 | 10,000 | 29.92 | 0 | 0 |
| 13:00 | 9,995 | 10,000 | 29.91 | .01 | 5 |
| 13:30 | 9,950 | 10,000 | 29.77 | .13 | 45 |
| 14:00 | 9,945 | 10,000 | 29.76 | .01 | 5 |

*Figure 2A*

| SPEED | ALTITUDE CHANGE | NOTIFICATION |
|---|---|---|
| 0-150 | 0-30 | NONE |
| 0-150 | >30 | WARNING |
| 151-300 | 10-30 | WARNING |
| 151-300 | >30 | ALERT |

SYSTEM AND METHOD FOR ADVANCE WARNING OF SEVERE WEATHER FOR GENERAL AVIATION AIRCRAFT

BACKGROUND OF THE INVENTION

1. Technical Field

The present invention relates in general to a system and method for advanced warning of severe weather for general aviation aircraft. More particularly, the present invention relates to a system and method for monitoring atmospheric conditions and notifying a pilot of atmospheric pressure changes.

2. Description of the Related Art

Business, commercial, and general aviation aircraft include large aircraft that is in use by commercial airliners as well as small aircraft which are in use by private pilots. A large aircraft may detect changing atmospheric conditions enroute by using an onboard weather radar system that identifies an upcoming weather pattern, such as a thunderstorm. Most general aviation aircraft, however, do not typically have onboard weather tracking equipment and, therefore, a majority of pilots depend on less sophisticated means to identify upcoming storm patterns.

These pilots typically rely on weather maps in which they print and view prior to a flight. A challenge found, however, is that these weather maps are outdated by time the pilot completes his flight. For example, a pilot may use a weather map and assume he is flying on the perimeter of a severe thunderstorm. However, if the storm pattern changes speed or direction, the pilot may find himself heading into the thunderstorm.

A private or commercial pilot holds a certificate upon which he may have a rating of instrument airplane or instrument helicopter that permits him to fly in visually impaired conditions. For example, a pilot that has an instrument airplane rating is permitted to fly in clouds whereby the pilot uses his onboard instrumentation to fly his aircraft. Instrument airplane rated pilots are typically the pilots that encounter severe weather predicaments because the pilot starts flying into a cloud and he is not able to determine whether upcoming weather conditions are better or worse than what he is currently experiencing.

Moisture content changes are a major factor which cause unstable weather conditions. Moisture content changes, in turn, create air pressure changes. In particular, low-pressure areas typically indicate severe weather conditions that include thunderstorms and wind gusts. A challenge found, however, is that a pilot is not aware of changing pressure conditions and, more importantly, the pilot is not aware of the rate at which the pressure conditions are changing.

What is needed, therefore, is a system and method for informing a pilot as to changing pressure conditions during a flight in order to provide the pilot severe weather advance warning.

SUMMARY

It has been discovered that the aforementioned challenges are resolved by calculating atmospheric pressure changes using a weather tracker to receive data from an onboard barometric altimeter and a Global Positioning System (GPS) device. The weather tracker notifies a user in response to the rate of atmospheric pressure changes and an aircraft's speed.

The weather tracker monitors changing pressure conditions that surround an aircraft in order to provide a pilot advanced warning of severe weather, such as weather that accompanies a low-pressure area. The aircraft includes a barometric altimeter which displays an altitude reading based upon a fixed reference pressure that a pilot receives at his departing airport prior to take-off.

A GPS device receives GPS signals from GPS satellites and computes an aircraft's longitude, latitude, and true altitude. The true altitude is the aircraft's actual altitude which is not affected by changing pressure conditions that surround the aircraft. The weather tracker calculates changing atmospheric conditions using the barometric altimeter's altitude reading, the reference pressure that is set at take-off, and the GPS device's true altitude measurement.

The weather tracker retrieves preferences information and uses the preferences information to determine whether to notify the user of changing weather conditions based upon calculated pressure changes and the aircraft's speed For example, the user may configure the weather tracker to notify the user whenever the weather tracker calculates an atmospheric pressure change greater than 0.15 inches of mercury while the aircraft is traveling over 200 mph.

The weather tracker displays a notification message on a display to notify the user of the atmospheric pressure changes and may continue to display the notification message until the weather tracker receives an acknowledgement message from the user. The user may also request alternative flight information from the device, such as local airport locations or alternative flight path information.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 2A is a look-up table showing various altitude measurements and corresponding pressure calculations which are displayed to a user at particular intervals;

FIG. 2B is a user configuration table showing notification preferences that correspond to an aircraft's speed and the aircraft's altitude change;

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
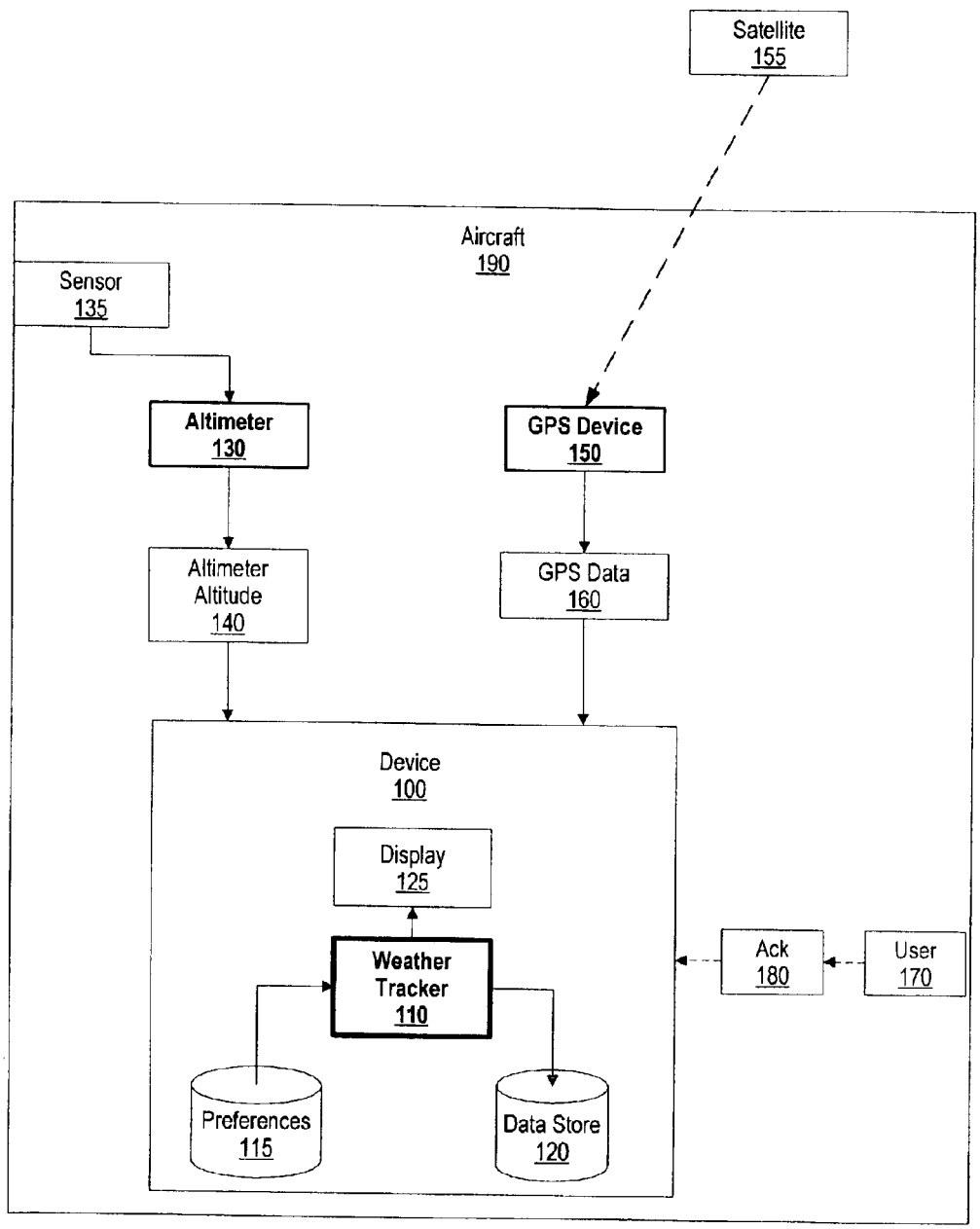
FIG. 1 is a diagram showing a user using a device to monitor atmospheric conditions that surround the user's piloted vehicle.

FIG. 1 is a diagram showing a user using a device to monitor atmospheric conditions that surround the user's piloted vehicle. User 170 uses device 100 to track changing pressure conditions that surround aircraft 190 in order to receive advanced warning of severe weather, such as weather that accompanies a low-pressure front. Aircraft 190 includes sensor 135 which sends atmospheric pressure information to altimeter 130. Altimeter 130 converts the pressure data to an altitude reading, and sends altitude reading altimeter altitude to device 100. For example, altimeter 130 may receive a pressure reading of 20.92 inches of mercury (in. Hg) from sensor 135 and translate the pressure reading to an altimeter altitude of 10,000 feet.

Global Positioning System (GPS) device 150 receives GPS signals from satellite 155 and computes aircraft 190's longitude, latitude, and true altitude. Satellite 155 is part of a plurality of geo-synchronous satellites that orbit the earth and transmit a signal in which GPS device 150 uses to calculate a location. GPS device 150 typically receives simultaneous signals from five or six satellites and calculates a location based upon the time difference between the signals. GPS device 150 sends GPS data 160 to device 100 which includes the true altitude of aircraft 190. The true altitude is aircraft 190's actual altitude in which the calculation is not affected by changing pressure conditions that surround aircraft 190.

Figure 3:
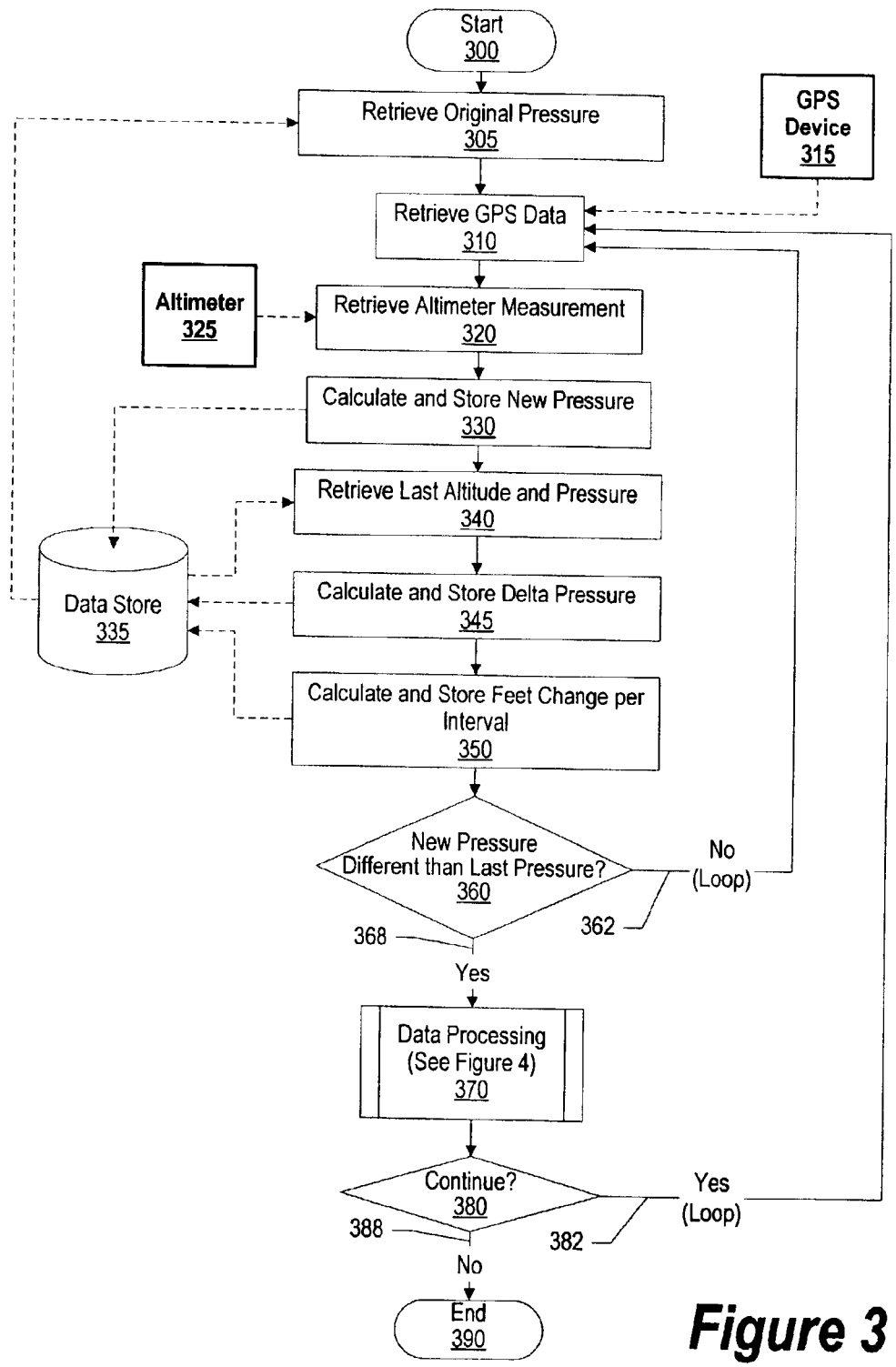
FIG. 3 is a flowchart showing steps taken in calculating and processing pressure changes.

Device 100 includes weather tracker 110 which calculates changing atmospheric conditions using altimeter altitude 140, GPS data 160, and a reference pressure that set by a pilot at take-off based upon information received through a weather channel at the pilot's departing airport (see FIGS. 2A, 3, and corresponding text for further details regarding pressure change calculations). For example, weather tracker uses altimeter altitude 140 and GPS data 160 to calculate an atmospheric pressure change and a corresponding altitude change. Weather tracker 110 stores altimeter altitude 140, GPS data 160, and the calculated atmospheric condition changes in data store 120. Data store 120 may be stored on a non-volatile storage area, such as random access memory.

Figure 4:
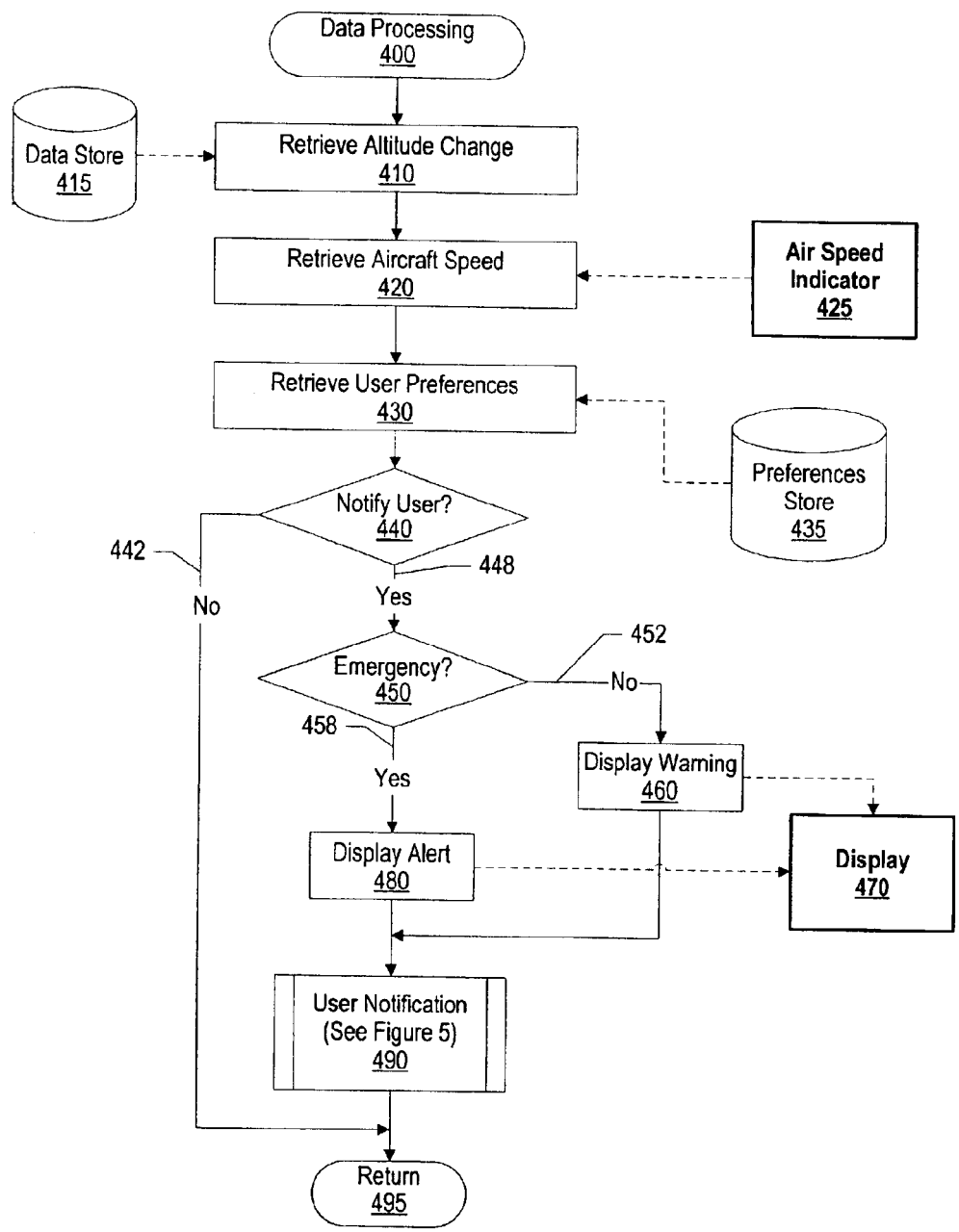
FIG. 4 is a flowchart showing steps taken in analyzing pressure data along with aircraft speed, and notifying a user based upon user preferences.
Figure 5:
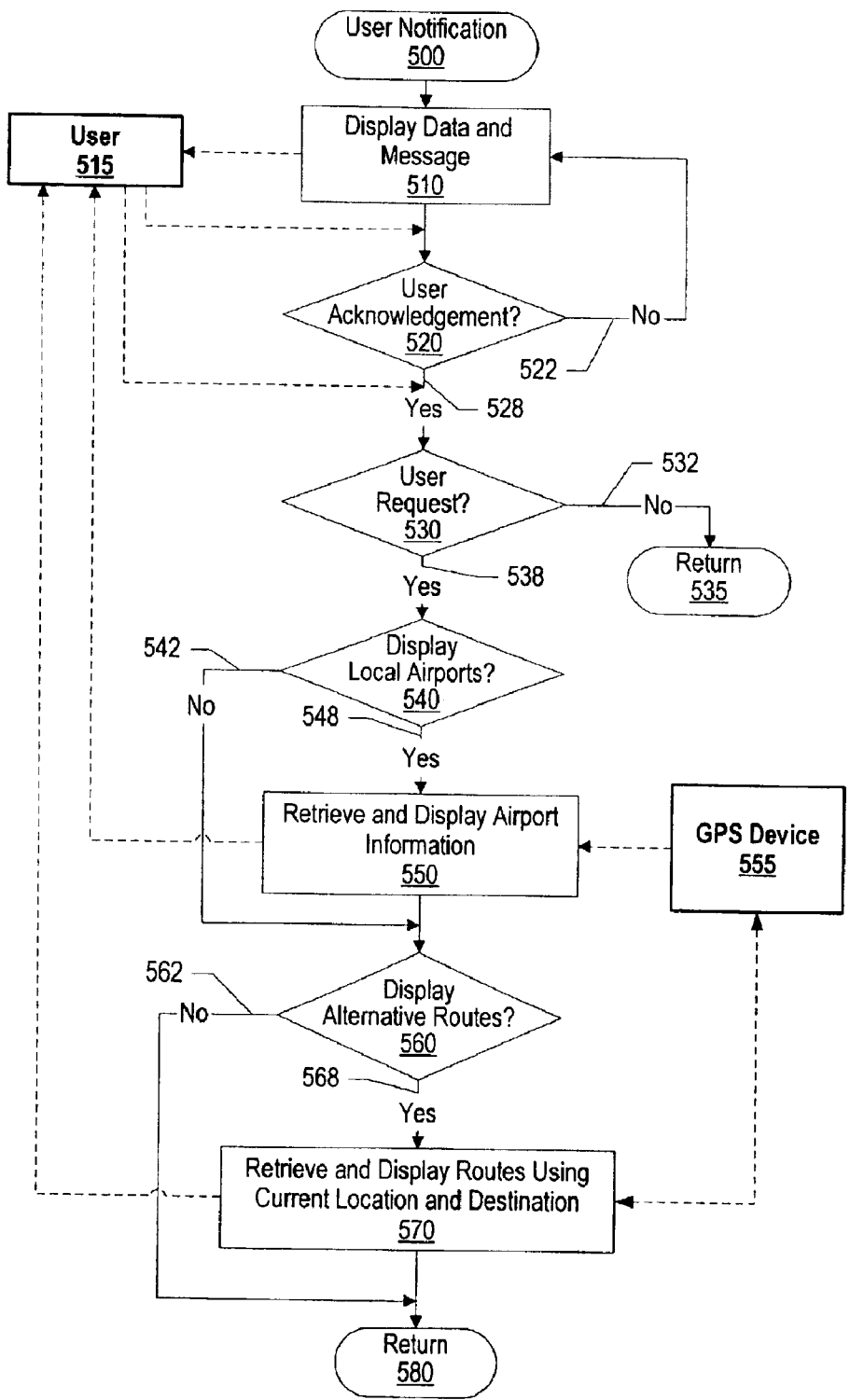
FIG. 5 is a flowchart showing steps taken in notifying a user of pressure changes and providing alternative information in response to a user request.

Weather tracker 110 retrieves preferences information from preferences 115, and uses the preferences information to identify whether to notify user 170 of changing weather conditions based upon a calculated altitude change and aircraft 190's speed (see FIGS. 4, 5, and corresponding text for further details regarding user notification). For example, user 170 may configure device 100 to notify him whenever device 100 measures an altitude change greater than thirty feet and aircraft 190 is traveling over 200 mph.

Weather tracker 110 displays a notification message on display 125 to notify user 170 of the atmospheric pressure changes. In one embodiment, weather tracker 110 creates an audible tone to notify user 170 of atmospheric pressure changes. Device 100 displays the notification message until device 100 receives acknowledge 180 from user 170. User 170 may also request alternative flight information from device 100, such as local airport locations or alternative flight path information, in which device 100 communicates with GPS device 150 to retrieve alternate flight information and display the information corresponding to user 170's request on display 125. In one embodiment, user 170 may use atmospheric pressure change information along with a weather map to identify weather pattern changes in speed or direction.

FIG. 2A is a look-up table 200 showing various altitude measurements and corresponding pressure calculations which are displayed to a user, such as a pilot, at particular intervals. Column 205 includes a list of interval times at which atmospheric data is collected at thirty minute intervals. Column 210 includes a list of altitude measurements which are retrieved from a Global Positioning System (GPS) device at corresponding interval times shown in column 205 whereas column 215 includes a list of altimeter measurements which are retrieved from an onboard altimeter at the corresponding interval times. Column 220 includes a list of pressures that are calculated using GPS altitude measurements, altimeter measurements, and a fixed reference pressure that a pilot enters in the onboard barometric altimeter (see FIG. 4 and corresponding text for further details regarding pressure calculations). Column 225 includes a list of pressure changes corresponding to pressure calculations that are listed in column 220 (see FIG. 4 and corresponding text for further details regarding pressure change calculations). Column 230 includes a list of altitude changes corresponding to GPS altitude measurements (e.g. column 210) relative to barometric altimeter measurements (e.g. column 215) (see FIG. 4 and corresponding text for further details regarding altitude change calculations).

Row 235 includes interval data that is obtained at time "12:00". At time 12:00, a pilot is located on the ground at a departing airport whereby the departing airport's elevation is 300 feet above sea level. The pilot listens to the departing airport's weather channel which informs the pilot that the current barometric pressure is 29.92 inches of mercury (in. Hg). The pilot sets a Kollsman indicator located on his barometric altimeter to "29.92" which becomes his fixed reference pressure. The pilot's GPS device reads a true altitude of 300 feet and the pilot's altimeter reads an altitude of 300 feet because the fixed reference pressure is currently the same as the actual pressure that is outside the aircraft. At time 12:00, there is no pressure change and there is no difference in altitude measurement between the GPS device and the barometric altimeter.

Row 240 includes interval data that is obtained at time "12:30". At time 12:30, the pilot's GPS device and altimeter measures the pilot's aircraft flying at 10,000 feet. In the example shown in FIG. 2A, pressure has not changed since the pilot left the departing airport and, therefore, no pressure change is shown in row 240.

Row 245 includes interval data that is obtained at time "13:00". At time 13:00, the pilot's GPS device measures a true altitude of 9,995 feet whereas the pilot's altimeter measures an altitude of 10,000. The pilot's altimeter measures 10,000 feet because the pilot uses the altimeter in order to keep his aircraft at a particular altitude (i.e. 10,000 feet) corresponding to his flight pattern. When atmospheric pressure changes, a barometric altimeter miscalculates a true altitude but the pilot still flies his aircraft based upon the barometric altimeter. Therefore, when pressure decreases, the altimeter displays higher altitudes that the true altitude. In turn, the pilot descends his aircraft until the altitude displays his assigned altitude. The effect of this is phenomenon is that the pilot thinks he is flying at 10,000 feet but he is actually flying at a lower altitude which is measured by the GPS device.

Row 245 includes a new pressure of 29.91 in. Hg whereby the pressure is calculated using the GPS true altitude, the altimeter measurement, and the fixed reference pressure reading (see FIG. 4 and corresponding text for further details regarding pressure calculations). Row 245 reflects a pressure change of 0.01 in. Hg and an altitude change of five feet. Interval data included in row 245 indicates that the pilot is about to encounter a low pressure area.

Row 250 includes interval data that is obtained at time "13:30". At time 13:30, the pilot's GPS device measures a true altitude of 9,950 feet whereas the pilot's barometric altimeter still measures an altitude of 10,000 because the pilot is using the altimeter to maintain his aircraft at a particular altitude as described above. Row 250 includes a new pressure of 29.77 in. Hg that is calculated using the GPS true altitude, the barometric altitude measurement, and the fixed reference pressure reading (see FIG. 4 and corresponding text for further details regarding pressure calculations). Row 250 reflects a pressure change of 0.13 in. Hg and an altitude change of 45 feet. Interval data included in row 250 indicates that the pilot is encountering a low pressure front.

Row 255 includes interval data that is obtained at time "14:00". At time 14:00, the pilot's GPS device measures a true altitude of 9,945 feet whereas the pilot's barometric altimeter still measures an altitude of 10,000 because the pilot is using the altimeter to maintain his aircraft at a particular altitude as described above. Row 255 includes a new pressure of 29.76 in. Hg that is calculated using the new true altitude (see FIG. 4 and corresponding text for further details regarding pressure calculations). Row 255 reflects a pressure change of 0.01 in. Hg and an altitude change of 5 feet. Interval data included in row 255 indicates that the pilot is passing through a low pressure area.

During flight, a pilot may be notified of altitude changes based upon the rate of altitude change as well as the aircraft speed (see FIG. 2B, 4, and corresponding text for further details regarding notification messages). In the example shown in FIG. 2A, a weather tracker may display a "Warning" message at row 245, and may display an "Alert" message at row 250.

FIG. 2B is a user configuration table showing notification preferences that correspond to an aircraft's speed and the aircraft's altitude change. Table 260 includes columns 265, 270, and 275 which are configured by a user whereby the user sets notification levels based upon the user's aircraft speed and its altitude change.

Column 265 includes a list of aircraft speed settings that a user configures corresponding to the capabilities of his aircraft. For example, a user of a small propeller driven aircraft may have aircraft speed ranges of 0–100, 101–150, and 150–200 mph whereas a user of a large jet aircraft may have aircraft speed ranges of 0–300, 301–450, and 451–700 mph.

Column 270 includes a list of aircraft speed settings that a user configures corresponding to the flight pattern of his aircraft. Small aircraft tend to fly at lower altitudes than larger altitudes and, as such, an altitude change, such as 50 feet, is more significant to a smaller aircraft than a larger aircraft. For example, a user of a small propeller driven aircraft may have altitude change ranges of 0–10, 11–30, and >30 feet whereas a user of a large jet aircraft may have altitude change ranges of 0–50, 51–100, and >100 feet.

Column 275 includes a list of user defined notification preferences corresponding to particular aircraft speed ranges and altitude change ranges. For example, a user may configure column 275 such that he is not notified of small altitude changes when traveling at slow speeds, but he is warned of small altitude changes when traveling at faster speeds because the user will encounter severe weather at a faster rate when traveling at faster speeds.

Rows 280 through 295 show various user defined settings with corresponding notification levels. Row 280 shows that the user does not wish to be notified of altitude changes in the range of 0–30 feet when the user is traveling between 0–150 mph. This is because the altitude change is relatively minor and the user is traveling at slow speeds.

Row 285 shows that the user requests a "WARNING" message to be displayed when altitude changes occur greater than 30 feet when the user is traveling between 0–150 mph. This is because even though the user is traveling at slow speeds, the altitude change is significant enough that the user wishes to be notified. Row 290 shows that the user requests a "WARNING" message to be displayed when altitude changes occur between 10–30 feet when the user is traveling between 151–300 mph. This is because even though the altitude change is not significant, the user is travel at a fast speed and, therefore, the user is approaching a low-pressure front at a faster rate than if the user were traveling at slower speeds. Row 295 shows that the user requests an "ALERT" message to be displayed when altitude changes occur greater than 30 feet when the user is traveling between 151–300 mph. This is because the user is approaching a low pressure front at a fast rate and the user's aircraft experienced a significant altitude change.

FIG. 3 is a flowchart showing steps taken in calculating and processing pressure changes. Processing commences at 300, whereupon processing retrieves a fixed reference pressure reading from data store 335 (step 305). A pilot, prior to take-off, sets the fixed reference pressure reading by monitoring a weather channel that provides a pressure reading at his departing airport. For example, a pilot may be departing from an airport and tune his radio to his departing airport's weather channel which provides him with a pressure reading at the airport, such as 29.92 inches of mercury (in. Hg). In this example, the pilot sets his Kollsman indicator located on his altimeter to the pressure reading he heard on the weather channel (e.g. 29.92 in. Hg) which is stored in data store 335. Data store 335 may be stored on a non-volatile storage area, such as random access memory.

Processing retrieves global positioning system (GPS) data from GPS device 315 at step 310. GPS device 315 may be a portable commercial device that a pilot uses in his aircraft which calculates latitude, longitude, and altitude information using signals received from global positioning satellites. The GPS data includes a true altitude measurement corresponding to the altitude of the aircraft. For example, an aircraft's true altitude measurement may be 9,995 feet whereas the pilot's barometric altimeter reads 10,000 feet (see below).

Processing receives an altimeter measurement from altimeter 325 at step 320. Altimeter 325 is an onboard altimeter that provides an altitude measurement for a pilot to view.

Processing uses the GPS true altitude measurement, the fixed reference pressure, and the altimeter measurement to calculate an actual pressure at step 330 using the following formula:

$$\frac{\text{Fixed Reference Pressure}}{\text{Actual Pressure}} = \frac{\text{Altimeter Altitude Reading}}{GPS \text{ True Altitude}}$$

Using the example described above, the actual pressure is calculated as follows:

$$\frac{29.92 \text{ in. Hg}}{\text{Actual Pressure}} = \frac{10{,}000 \text{ Feet}}{9{,}995 \text{ Feet}}$$

Actual Pressure = 29.91 in. Hg

Processing retrieves a preceding calculated pressure value from data store 335 (step 340). Pressure calculations may be taken at particular intervals, such as every ten seconds, in order to track changing weather conditions. Processing calculates and stores a pressure change in data store 335 at step 345. The pressure change is the difference between the preceding stored pressure and the new actual pressure. Using the example described above, the pressure change is calculated as follows:

29.92 in. Hg−29.91 in. Hg=0.01 in. Hg pressure change

Processing also calculates the altitude change between the GPS true altitude measurement and the barometric altitude measurement (step 350). Using the example described above, the altitude change is calculated as follows:

10,000 feet−9,995 feet=5 feet altitude change

In one embodiment, processing does not use pressure changes to identify atmospheric condition changes but rather uses altitude change measurements as an indicator as to the stability of the atmospheric conditions.

Processing may be configured to sample altitude measurements frequently. However, processing may not wish to store each measurement unless a particular measurement is different than its preceding measurement. A determination is made as to whether the new pressure calculation is different than the preceding pressure calculation (decision 360). If the new pressure is not different than its preceding pressure calculation, decision 360 branches to "No" branch 362 which loops back to retrieve and process altitude data. This looping continues until the new pressure measurement is different than its preceding pressure measurement, at which point decision 360 branches to "Yes" branch 368 whereupon altitude and pressure data are processed (pre-defined process block 370, see FIG. 4 and corresponding text for further details).

A determination is made as to whether to continue tracking atmospheric conditions (decision 380). For example, processing may track atmospheric conditions until an aircraft lands. If processing should continue to track atmospheric conditions, decision 380 branches to "Yes" branch 382 which loops back to retrieve and process altitude data. This looping continues until processing should halt, at which point decision 380 branches to "No" branch 388 whereupon processing ends at 390.

FIG. 4 is a flowchart showing steps taken in analyzing pressure data along with aircraft speed, and notifying a user based upon user preferences. Data processing commences at 400, whereupon processing retrieves a new altitude change value from data store 415 at step 410. The new altitude change was previously calculated using a GPS true altitude measurement (see FIG. 3 and corresponding text for further details regarding altitude change calculations). Data store 415 may be stored on a non-volatile storage area, such as random access memory.

Processing retrieves the aircraft's speed from air speed indicator 425 at step 420. An aircraft's speed is useful in identifying the criticality of changing weather conditions. For example, an aircraft that is traveling at 400 mph will encounter severe weather conditions twice as fast as an aircraft that is traveling at 200 mph. Processing retrieves user preferences from preferences store 435 at step 430. The user preferences include notification preferences corresponding to altitude changes and aircraft speed (see FIG. 2B and corresponding text for further details regarding user preferences). Preference store 435 may be stored on a non-volatile storage area, such as random access memory.

A determination is made as to whether to notify the user (decision 440). For example, a user's aircraft may be traveling at 200 mph and its altitude change is five feet, in which case the user may have configured his user preferences such that the user is not notified in these particular situations.

If processing should not notify the user, decision 440 branches to "No" branch 442 bypassing user notification steps. On the other hand, if processing should notify the user, decision 440 branches to "Yes" branch 448 whereupon a determination is made as to the severity of the notification (decision 450). If the conditions are not critical but the user wishes to be notified, decision 450 branches to "NO" branch 452 whereupon processing displays a "Warning" message on display 470 at step 460. On the other hand, if the conditions are critical, decision 450 branches to "Yes" branch 458 whereupon processing displays an "Alert" message on display 470 at step 480.

Processing waits for the user to acknowledge the notification message, and proceeds to process user requests corresponding to alternative flight information (pre-defined process block 490, see FIG. 5 and corresponding text for further details). Processing returns at 495.

FIG. 5 is a flowchart showing steps taken in notifying a user of pressure changes and providing alternative information in response to a user request. Processing commences at 500, whereupon processing displays altitude and pressure data along with a notification message to user 515 (step 510). For example, the user's aircraft may be approaching an upcoming low pressure area at 300 mph, and a user's weather tracker has calculated an altitude change of 50 feet. In this example, the user may be notified with an "Alert" message on his display as well as displaying the pressure change and altitude change values (see FIG. 2B and corresponding text for further details regarding pilot notification).

A determination is made as to whether the user acknowledges the notification (decision 520). For example, processing may require the user to select an "OK" button which informs processing that the user is aware of the notification message. If the user has not acknowledged the notification message, decision 520 branches to "No" branch 522 which loops back to continue displaying the notification message. This looping continues until the user acknowledges the notification message, at which point decision 520 branches to "Yes" branch 528.

A determination is made as to whether user 515 wishes to view alternative flight information (decision 530). For example, the user may wish to land his aircraft at a nearby airport due to weather conditions and wish to view the nearest airport. If the user does not wish to view alternative flight information, decision 530 branches to "No" branch 532 whereupon processing returns at 535. On the other hand, if user 515 wishes to view alternative flight information, decision 530 branches to "Yes" branch 538 whereupon a determination is made as to whether the user wishes to view local airport locations (decision 540).

If the user does not wish to view local airport information, decision 540 branches to "No" branch 542 bypassing local airport information retrieval steps. On the other hand, if the user wishes to view local airport information, decision 540 branches to "Yes" branch 548 whereupon processing retrieves local airport information from GPS device 555 at step 550. GPS device 555 is a global positioning system (GPS) device that user 515 may carry onboard his aircraft and includes standard software that uses user 515's position to identify local airport locations.

A determination is made as to whether user 515 wishes to view alternative flight pattern routes (decision 560). For example, user 515 may wish to fly further south in order to avoid a low pressure front that is moving from the North. If user 515 does not wish to view alternative flight pattern routes, decision 560 branches to "No" branch 562 bypassing alternative flight pattern retrieval steps. On the other hand, if user 515 wishes to view alternative flight pattern routes, decision 560 branches to "Yes" branch 568 whereupon processing retrieves flight pattern routes from GPS device 555 at step 570. GPS device 555 includes standard software that identifies flight patterns based upon a user's current location and the user's destination. Processing returns at 580.

Figure 6:
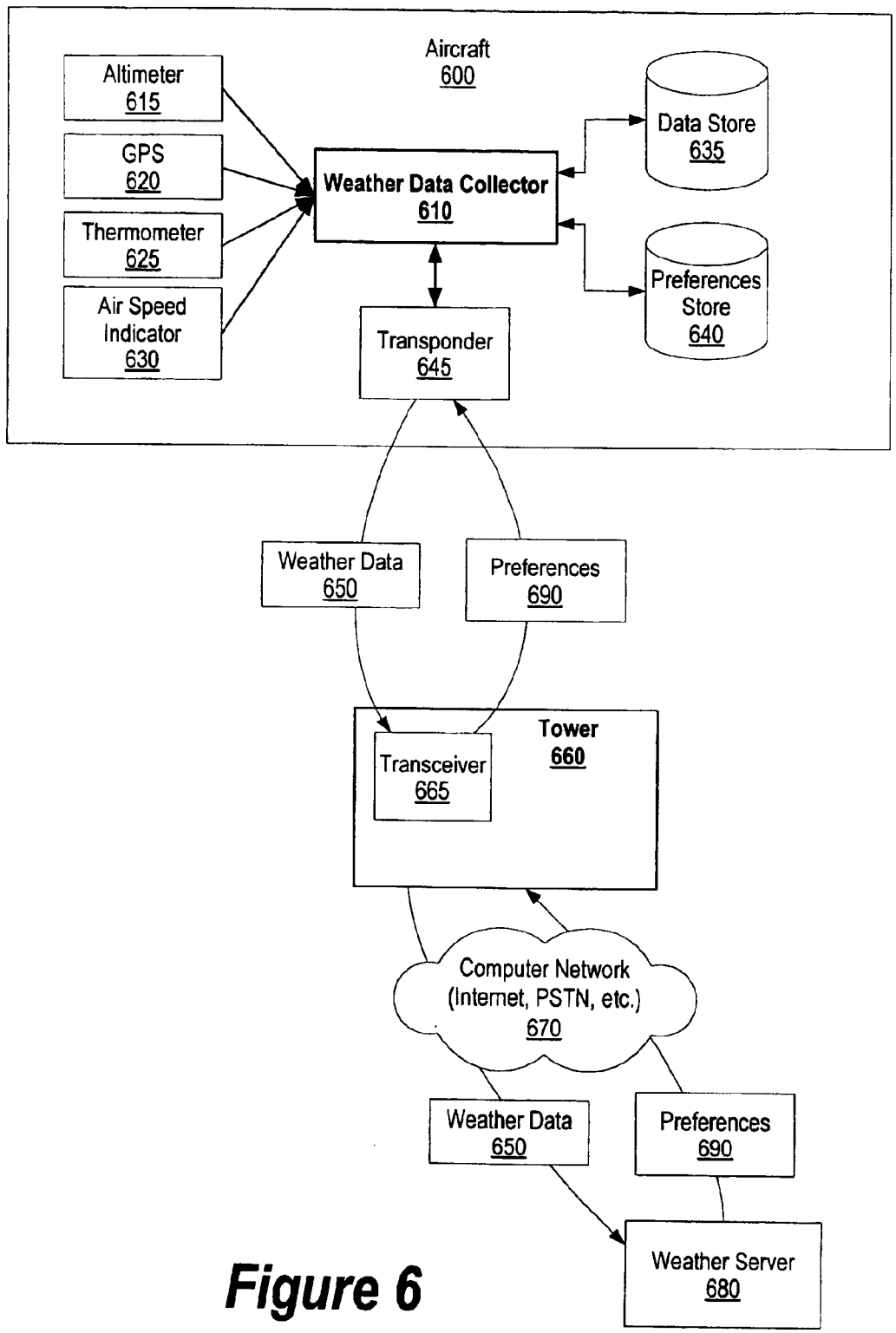
FIG. 6 is a diagram showing a piloted vehicle collecting atmospheric data and sending the atmospheric data to a weather server.

FIG. 6 is a diagram showing a piloted vehicle collecting atmospheric data and sending the atmospheric data to a weather server. Aircraft 600 includes weather data collector 610 which samples atmospheric information from various sensors that are located onboard aircraft 600. For example, aircraft 600 may be a commercial airliner and weather data collector 610 retrieves atmospheric data from sensors located on the commercial airliner.

Aircraft 600 includes sensors to collect information corresponding to its surroundings such as barometric altimeter 615, GPS 620, thermometer 625, and air speed indicator 630. Barometric altimeter 615 samples air pressure that surrounds aircraft 600 and converts the air pressure to an altitude value (see FIGS. 1, 2A, and corresponding text for further details regarding barometric altimeter measurements). GPS 620 calculates latitude, longitude, and altitude information corresponding to aircraft 600's location using signals received from global positioning satellites. GPS 620 calculates a true altitude measurement corresponding to aircraft 600's altitude which is not distorted by changing pressure conditions. Thermometer 625 measures the temperature of aircraft 600's surroundings and air speed indicator 630 measures the wind speed that aircraft 600 is traveling.

Weather data collector 610 collects atmospheric data from sensors 615 through 630 and stores the atmospheric data in data store 635. Weather data collector 610 may use the atmospheric data to calculate other atmospheric conditions, such as pressure changes (see FIGS. 1–5 and corresponding text for further details regarding pressure change calculations). Data store 635 may be stored on a non-volatile storage area, such as random access memory. Weather data collector 610 retrieves preference information from preferences store 640 and identifies a time at which to send the atmospheric data to a weather server, such as weather server 680. The preferences may include information such as a transmission interval time and atmospheric data threshold settings (see FIG. 8 and corresponding text for further details regarding preference information).

Weather data collector 610 formats the atmospheric data and uses transponder 645 to send weather data 650 to tower 660 (i.e. air traffic control tower). Tower 660 receives weather data 650 using transceiver 665 and forwards weather data 650 to weather server 680 though computer network 670, such as the Internet. In one embodiment, weather data collector 610 provides atmospheric data to transponder 645 each time that tower 660 queries aircraft 600.

Weather server 680 analyzes the atmospheric data, and may update aircraft 600's preferences, such as its transmission interval. For example, if aircraft 600 is approaching an area with rapidly changing weather conditions, weather server 680 may wish to more frequently receive atmospheric data. If weather server 680 wishes to update aircraft 600's preferences, weather server 680 sends preferences 690 to tower 660 through computer network 670. In turn, tower 660 uses transceiver 665 to send preferences 690 to transponder 645. Transponder 645 forwards the new preferences to weather data collector 610 which, in turn, stores the new preferences in preferences store 640.

Figure 7:
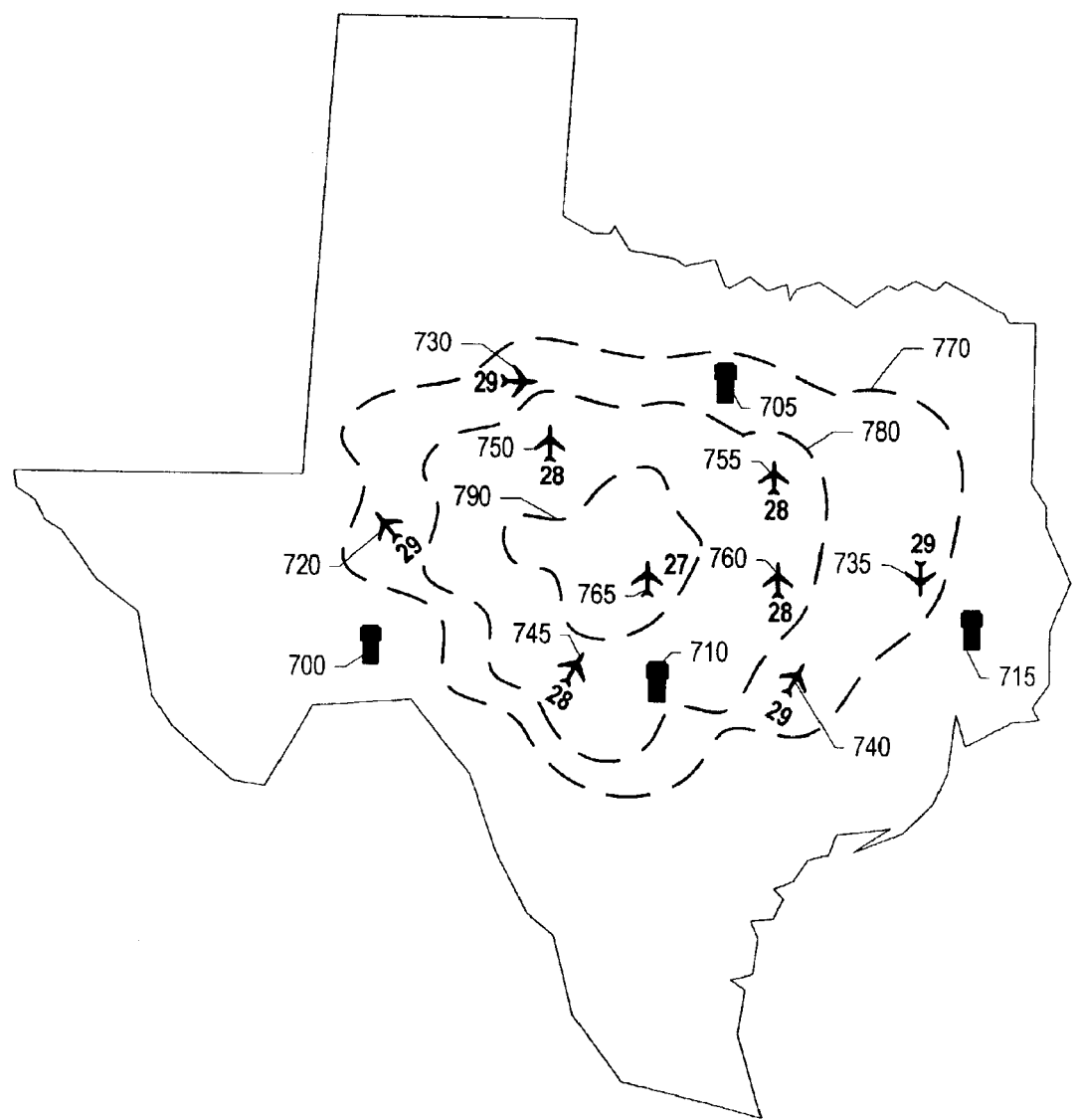
FIG. 7 is a diagram showing a plurality of aircraft collecting atmospheric data and providing the data to a plurality of air traffic control towers.

FIG. 7 is a diagram showing a plurality of aircraft collecting atmospheric data and providing the data to a plurality of air traffic control towers. Each aircraft shown in FIG. 7 includes an onboard weather data collector which collects atmospheric data and sends the atmospheric data to a nearby air traffic control tower In turn, the aircraft control tower forwards the atmospheric data to a weather server that uses the data to update weather forecasts. The example shown in FIG. 7 depicts various pressure readings in inches of mercury (in. Hg) that each aircraft measures (e.g. 27 in. Hg, 28 in. Hg, or 29 in. Hg).

Towers 700, 705, 710, and 715 are positioned at various locations (i.e. airports) and each tower receives atmospheric data via telemetry from an aircraft that is flying in the tower's airspace. For example, tower 700 may receive atmospheric data from aircraft 720 whereas tower 715 may receive atmospheric data from aircraft 735.

Aircrafts 720, 730, 735, and 740 are measuring an air pressure of 29 in. Hg. Aircrafts 745, 750, 755, and 760 are measuring an air pressure of 28 in. Hg and aircraft 765 is measuring an air pressure of 27 in. Hg. As each aircraft moves along its designated flight patterns, a weather server receives air pressure updates and the weather server uses the pressure data to identify pressure zones. The weather server analyzes the pressure data and plots pressure zone lines 770, 780, and 790 which show pressure areas corresponding to particular geographical areas.

Figure 8:
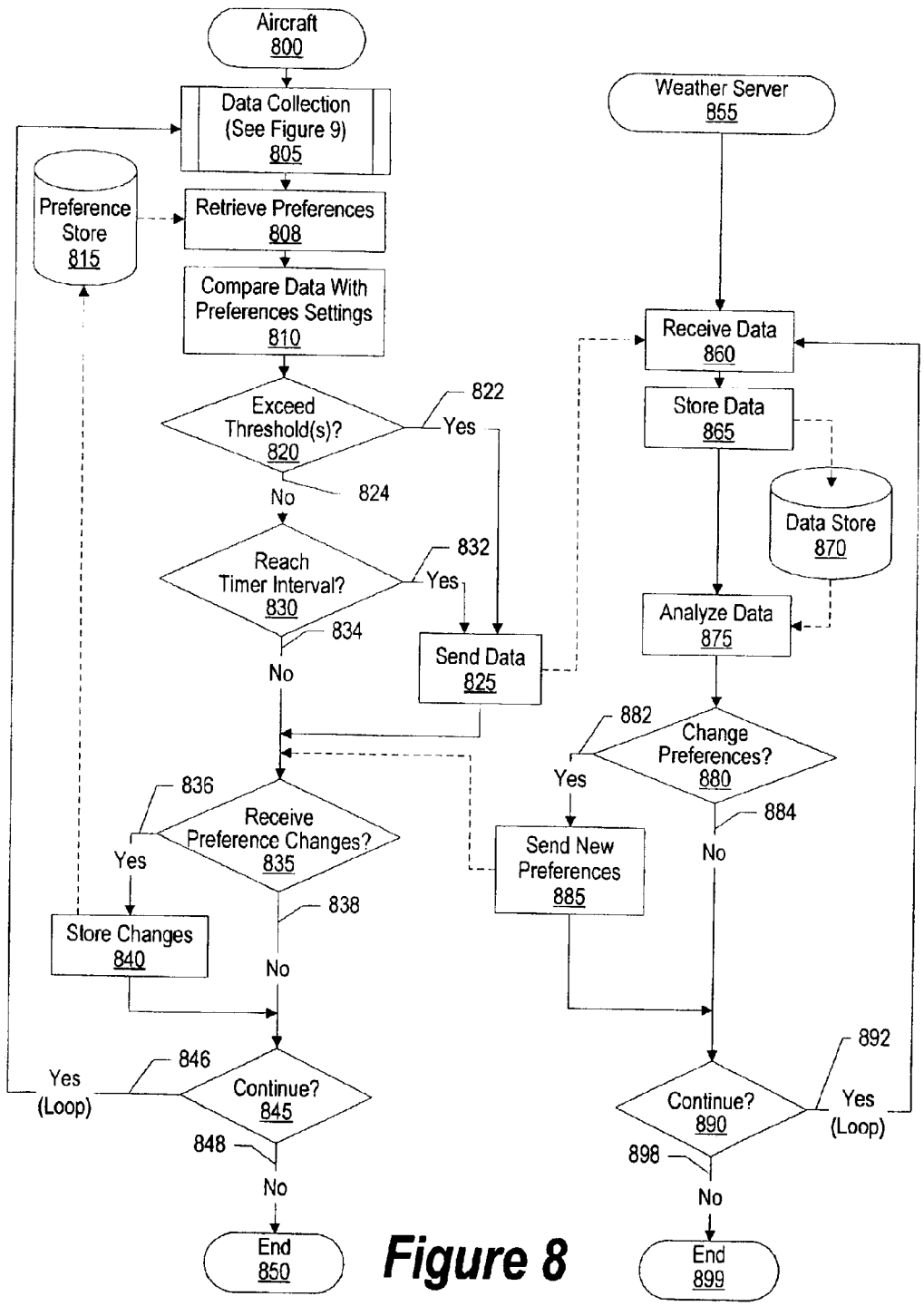
FIG. 8 is a flowchart showing steps taken in an aircraft sending atmospheric data to a weather server and receiving preferences settings from the weather server.

A weather server is able to send preference information to a particular aircraft which includes an interval rate at which to collect atmospheric data (see FIGS. 6, 8, and corresponding text for further details regarding preference settings). For example, a weather server may wish to collect an extensive amount of data corresponding to a particular geographical area and identifies aircraft that are flying, or will be flying, through the geographical area. In this example, the weather server may instruct each identified aircraft to send atmospheric data at one-minute intervals.

FIG. 8 is a flowchart showing steps taken in an aircraft sending atmospheric data to a weather server and receiving preferences settings from the weather server. Atmospheric data collection processing commences at 800, whereupon processing queries various sensors onboard a piloted vehicle and performs various calculations using the collected atmospheric data (pre-defined process block 805, see FIG. 9 and corresponding text for further details).

Processing retrieves preferences settings from preferences store 815 at step 808. Preferences settings include an interval time, such as 30 minutes, that the piloted aircraft is to send atmospheric data to the weather service. Preferences settings also include threshold settings corresponding to particular atmospheric data. For example, a threshold setting may be set such that if a pressure change exceeds a particular value, such as three inches of mercury, the piloted aircraft sends the atmospheric data to a weather server.

Processing compares the collected and calculated atmospheric data with preferences settings at step 810. A determination is made as to whether at least one of the atmospheric data exceeds one or more threshold settings included in the preferences settings (decision 820). If the atmospheric data exceeds one of the corresponding threshold settings, decision 820 branches to "Yes" branch 822 whereupon processing sends atmospheric data to the weather server at step 825.

On the other hand, if the atmospheric data does not exceed one of the threshold settings included in the preferences settings, decision 820 branches to "No" branch 824 whereupon a determination is made as to whether processing has reached a transmission time interval (decision 830). For example, a transmission time interval may be configured such that a piloted vehicle sends atmospheric data to a weather server at ten-minute intervals. If processing has reached the transmission time interval, decision 830 branches to "Yes" branch 832 whereupon processing sends the atmospheric data to the weather server at step 825. On the other hand, if processing has not reached the transmission time interval, decision 630 branches to "No" branch 834.

A determination is made as to whether processing received preferences setting changes from the weather server (decision 835). For example, the piloted vehicle may be approaching an area with rapidly changing weather conditions and the weather server may wish to receive atmospheric data more frequently. If the piloted aircraft received preference changes from the weather server, decision 835 branches to "Yes" branch 836 whereupon processing stores the preferences changes in preferences store 815 at step 840. On the other hand, if the piloted vehicle did not receive preferences changes from the weather server, decision 835 branches to "No" branch 838 bypassing preferences storing steps.

A determination is made as to whether to continue processing (decision 845). For example, an aircraft may continue to sample atmospheric data and send the data to the weather server until the aircraft lands at an airport. If processing should continue, decision 845 branches to "Yes" branch 846 which loops back to collect and process more atmospheric data. This looping continues until processing should halt, at which point decision 845 branches to "No" branch 848 whereupon processing ends at 850.

Weather server processing commences at 855, whereupon the server receives atmospheric data that is sent from the piloted vehicle (step 860). Processing stores the atmospheric data in data store 870 at step 865. Data store 865 may be stored on a non-volatile storage area, such as random access memory. The weather server analyzes the data at step 875 to identify trends or rapidly changing weather conditions. For example, an aircraft may have been sending atmospheric data that includes a pressure change of zero inches of mercury, and its latest received pressure change is five inches of mercury. In this example, the weather server identifies that significant changes are occurring in atmospheric conditions that surround the aircraft.

A determination is made as to whether the weather server wishes to update preferences settings for the piloted vehicle based upon its data analysis (decision 880). If the weather server wishes to update preferences, decision 880 branches to "Yes" branch 882 whereupon processing sends new preference settings to the piloted aircraft at step 885. On the other hand, if the weather server does not wish to change preference settings, decision 880 branches to "No" branch 884 bypassing preference change sending steps.

A determination is made as to whether to continue processing (decision 890) For example, the weather server may continue processing until each aircraft that is providing atmospheric data has landed. If processing should continue, decision 890 branches to "Yes" branch 892 which loops back to receive and process more atmospheric data. This looping continues until processing should halt, at which point decision 890 branches to "No" branch 898 whereupon processing ends at 899.

Figure 9:
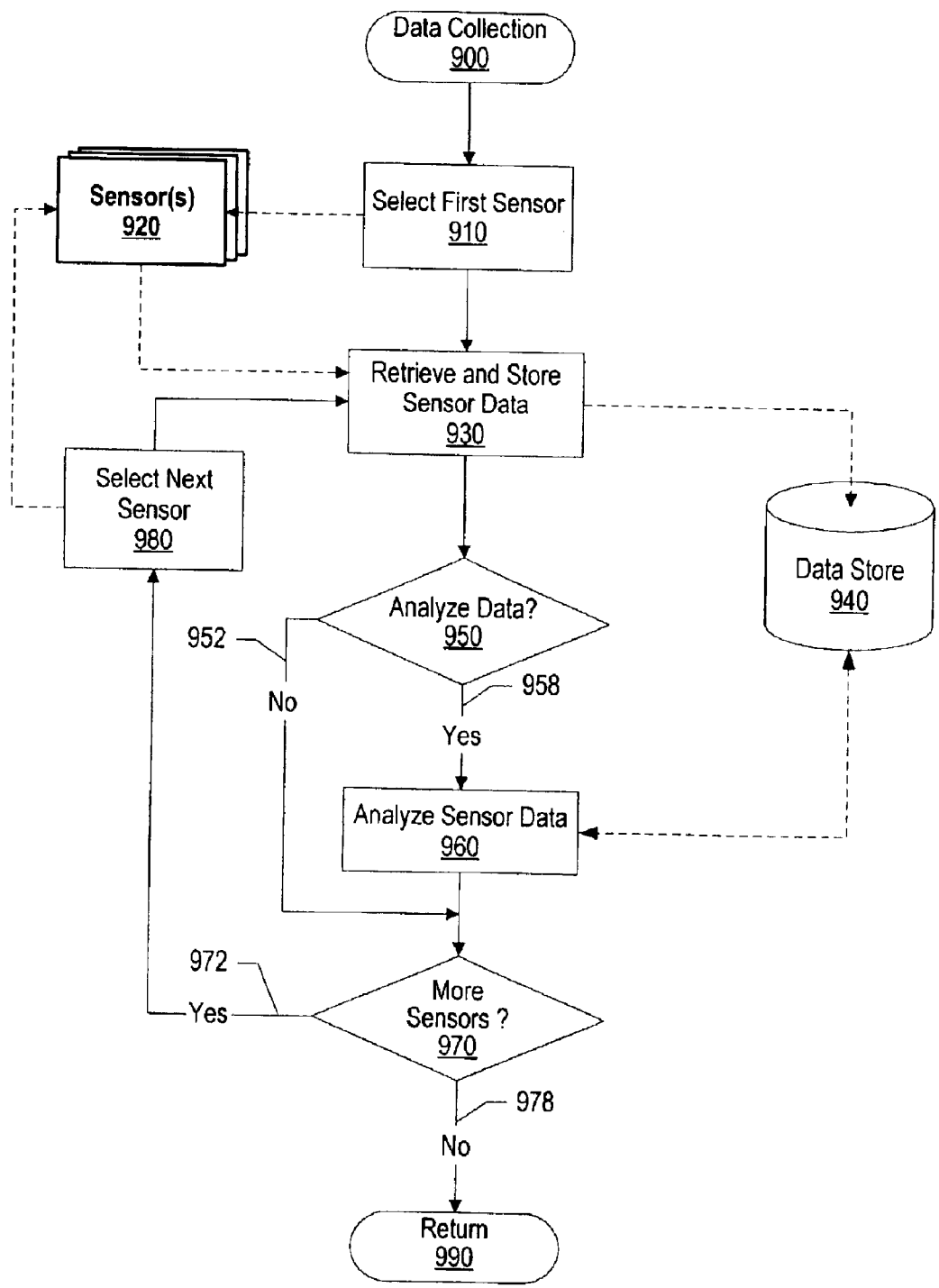
FIG. 9 is a flowchart showing steps taken in a piloted vehicle collecting atmospheric data from onboard sensors.

FIG. 9 is a flowchart showing steps taken in a piloted vehicle collecting atmospheric data from onboard sensors. Data collecting processing commences at 900, whereupon processing selects a first sensor from sensors 920 (step 910). For example, the piloted vehicle may be an aircraft and sensors 920 may include a barometric altimeter, a GPS unit, a thermometer, and an air speed indicator. Processing retrieves atmospheric data from the selected sensor and stores the atmospheric data in data store 940 at step 930. Using the example described above, a barometric altimeter provides pressure and altitude information which processing receives and stores in data store 940. Data store 940 may be stored on a non-volatile storage area, such as random access memory.

A determination is made as to whether to analyze the data (decision 950). For example, processing may not decide to analyze temperature information but may decide to analyze altitude information in order to determine if the piloted vehicle is entering a low pressure front (see FIGS. 1 through 6 and corresponding text for further details regarding altitude analysis). If processing should not analyze the data, decision 950 branches to "No" branch 952 bypassing data analysis steps. On the other hand, if processing should analyze the atmospheric data, decision 950 branches to "Yes" branch 958 whereupon processing analyzes the sensor data at step 960. Sensor data analysis may include various atmospheric calculations. Using the example described above, processing may use altimeter data and Global Positioning System (GPS) data to calculate pressure readings, changes in pressure, and changes in altitude (see FIGS. 1 through 6 and corresponding text for further details regarding atmospheric calculations).

A determination is made as to whether there are more sensors from which to receive atmospheric data (decision 970). For example, an aircraft may include multiple onboard sensors that measure altitude, temperature, and wind speed. If there are more sensors from which to collect sensor data, decision 970 branches to "Yes" branch 972 which loops back to select the next sensor (step 980) and process sensor data from the next sensor. This looping continues until there are no more sensors from which to receive data, at which point decision 970 branches to "No" branch 978 whereupon processing returns at 990.

Figure 10:
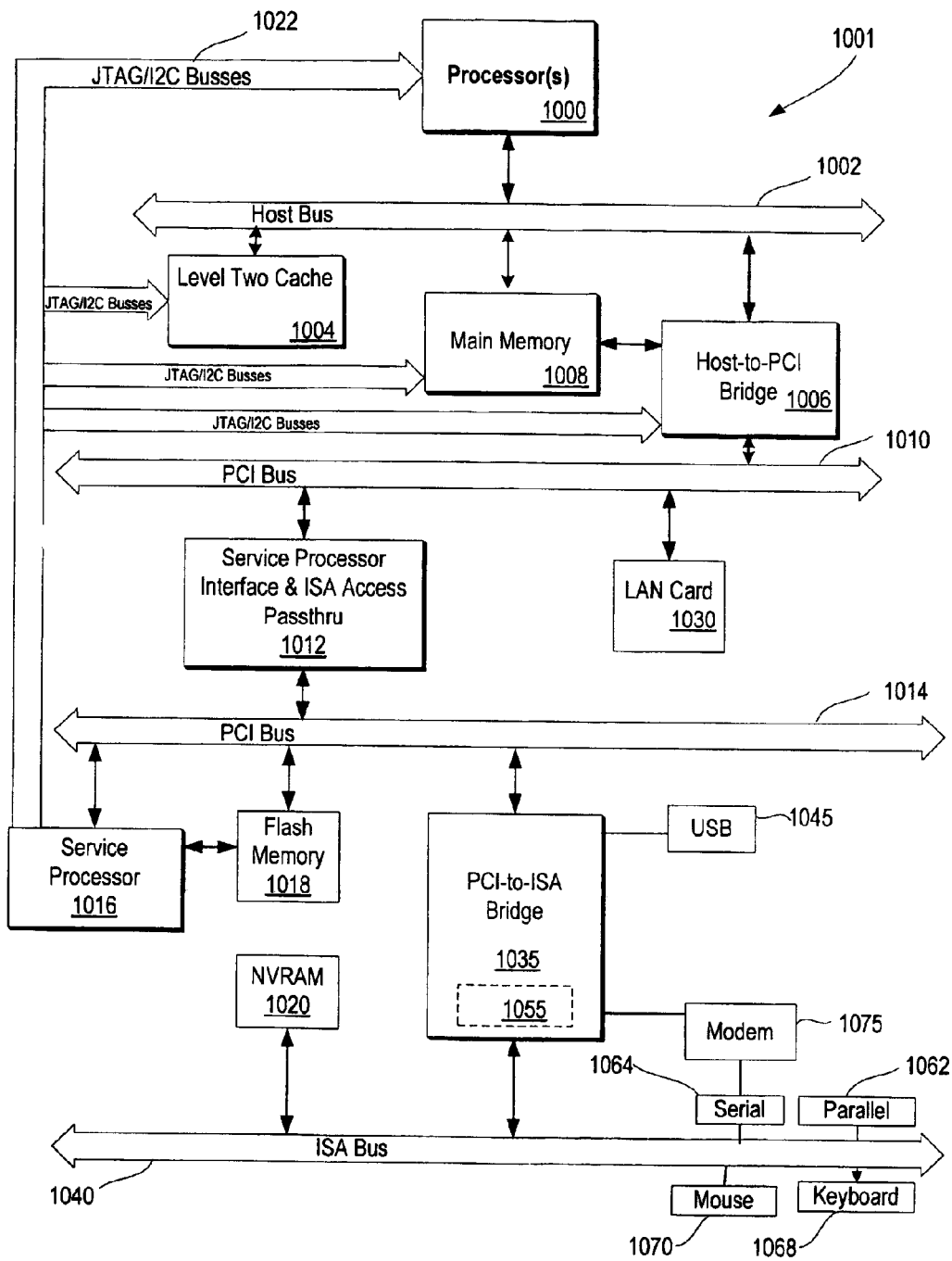
FIG. 10 is a block diagram of an information handling system capable of implementing the present invention.

FIG. 10 illustrates information handling system 1001 which is a simplified example of a computer system capable of performing the computing operations described herein. Computer system 1001 includes processor 1000 which is coupled to host bus 1002. A level two (L2) cache memory 1004 is also coupled to host bus 1002. Host-to-PCI bridge 1006 is coupled to main memory 1008, includes cache memory and main memory control functions, and provides bus control to handle transfers among PCI bus 1010, processor 1000, L2 cache 1004, main memory 1008, and host bus 1002. Main memory 1008 is coupled to Host-to-PCI bridge 1006 as well as host bus 1002. Devices used solely by host processor(s) 1000, such as LAN card 1030, are coupled to PCI bus 1010. Service Processor Interface and ISA Access Pass-through 1012 provides an interface between PCI bus 1010 and PCI bus 1014. In this manner, PCI bus 1014 is insulated from PCI bus 1010. Devices, such as flash memory 1018, are coupled to PCI bus 1014. In one implementation, flash memory 1018 includes BIOS code that incorporates the necessary processor executable code for a variety of low-level system functions and system boot functions.

PCI bus 1014 provides an interface for a variety of devices that are shared by host processor(s) 1000 and Service Processor 1016 including, for example, flash memory 1018. PCI-to-ISA bridge 1035 provides bus control to handle transfers between PCI bus 1014 and ISA bus 1040, universal serial bus (USB) functionality 1045, power management functionality 1055, and can include other functional elements not shown, such as a real-time clock (RTC), DMA control, interrupt support, and system management bus support. Nonvolatile RAM 1020 is attached to ISA Bus 1040. Service Processor 1016 includes JTAG and I2C busses 1022 for communication with processor(s) 1000 during initialization steps. JTAG/I2C busses 1022 are also coupled to L2 cache 1004, Host-to-PCI bridge 1006, and main memory 1008 providing a communications path between the processor, the Service Processor, the L2 cache, the Host-to-PCI bridge, and the main memory. Service Processor 1016 also has access to system power resources for powering down information handling device 1001.

Peripheral devices and input/output (I/O) devices can be attached to various interfaces (e.g., parallel interface 1062, serial interface 1064, keyboard interface 1068, and mouse interface 1070 coupled to ISA bus 1040. Alternatively, many I/O devices can be accommodated by a super I/O controller (not shown) attached to ISA bus 1040.

In order to attach computer system 1001 to another computer system to copy files over a network, LAN card 1030 is coupled to PCI bus 1010. Similarly, to connect computer system 1001 to an ISP to connect to the Internet using a telephone line connection, modem 1075 is connected to serial port 1064 and PCI-to-ISA Bridge 1035.

While the computer system described in FIG. 10 is capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for informing a user of atmospheric condition changes, said method comprising:

retrieving a first value using a computer system, the first value corresponding to a first altitude of an aircraft;

retrieving a second value using the computer system, the second value corresponding to a second altitude of the aircraft, wherein the second value is a calculated pressure that is calculated using a true altitude and wherein the first value is a barometric pressure used for calculating the first altitude;

computing a value change using the first value and the second value; and notifying the user in response to the value change.

2. The method as described in claim 1 wherein calculating the calculated pressure further comprises:

receiving the true altitude from a GPS device;

receiving an altimeter altitude from an altimeter;

retrieving a fixed reference pressure;

performing the calculating using the true altitude, the altimeter altitude, and the fixed reference pressure.

3. The method as described in claim 1 further comprising:

receiving a user request from the user; and displaying alternative flight information corresponding to the user request.

4. The method as described in claim 3 wherein the alternative flight information is selected from the group consisting of an airport location and an alternative flight pattern.

5. The method as described in claim 1 wherein the notifying includes displaying one or more altitude values, wherein at least one of the altitude values are selected from the group consisting of the true altitude, an altimeter altitude, the calculated pressure, a pressure change, and an altitude change.

6. The method as described in claim 1 wherein the notifying is performed using an audio signal.

7. The method as described in claim 1 wherein the computing the value change includes computing a rate of change of a difference between the first value and the second value.

8. A method for informing a user of atmospheric condition changes, said method comprising:

retrieving a first value using a computer system, the first value corresponding to a first altitude of an aircraft;

retrieving a second value using the computer system, the second value corresponding to a second altitude of the aircraft;

computing an altitude change using the first value and the second value;

retrieving an aircraft speed;

retrieving one or more user preferences;

determining whether to display a notification message to the user based upon the altitude change, the aircraft speed, and at least one of the user preferences; and notifying the user, wherein the notifying includes displaying a notification message in response to the determination.

9. The method as described in claim 8 wherein the notification message is selected from the group consisting of a warning message and an alert message.

10. The method as described in claim 8 wherein the first value is a true altitude that is received from a GPS device and wherein the second value is an altimeter altitude that is received from an altimeter.

11. An information handling system comprising:

one or more processors;

a memory accessible by the processors;

one or more nonvolatile storage devices accessible by the processors; and a weather tracking tool to notify a user of atmospheric condition changes, the weather tracking tool including:
means for retrieving a first value from the memory, the first value corresponding to a first altitude of an aircraft;
means for retrieving a second value from the memory, the second value corresponding to a second altitude of the aircraft, wherein the second value is a calculated pressure that is calculated using a true altitude and wherein the first value is a barometric pressure used for calculating the first altitude;
means for computing a value change using the first value and the second value; and
means for notifying the user using a display in response to the value change.

12. The information handling system as described in claim 11 wherein calculating the calculated pressure further comprises:

means for receiving the true altitude from a GPS device;

means for receiving an altimeter altitude from an altimeter;

means for retrieving a fixed reference pressure;

means for performing the calculating using the true altitude, the altimeter altitude, and the fixed reference pressure.

13. The information handling system as described in claim 11 further comprising:

means for receiving a user request from the user; and means for displaying alternative flight information corresponding to the user request.

14. The information handling system as described in claim 13 wherein the alternative flight information is selected from the group consisting of an airport location and an alternative flight pattern.

15. The information handling system as described in claim 11 wherein the notifying is performed using an audio signal.

16. The information handling system as described in claim 11 wherein the notifying includes displaying one or more altitude values, wherein at least one of the altitude values are selected from the group consisting of a the true altitude, an altimeter altitude, the calculated pressure, a pressure change, and an altitude change.

17. The information handing system as described in claim 11 wherein the means for computing the value change includes means for computing a rate of change of a difference between the first value and the second value.

18. An information handling system comprising:

one or more processors;

a memory accessible by the processors;

one or more nonvolatile storage devices accessible by the processors; and a weather tracking tool to notify a user of atmospheric condition changes, the weather tracking tool including:
means for retrieving a first value from the memory, the first value corresponding to a first altitude of an aircraft;
means for retrieving a second value from the memory, the second value corresponding to a second altitude of the aircraft;
means for computing an altitude change using the first value and the second value;
means for retrieving an aircraft speed;
means for retrieving one or more user preferences;
means for determining whether to display a notification message to the user based upon the altitude change, the aircraft speed, and at least one of the user preferences; and
means for notifying the user, wherein the notifying includes displaying a notification message in response to the determination.

19. The information handling system as described in claim 18 wherein the notification message is selected from the group consisting of a warning message and an alert message.

20. The information handling system as described in claim 18 wherein the first value is a true altitude that is received from a OPS device and wherein the second value is an altimeter altitude that is received from an altimeter.

21. A computer program product stored on a computer operable media for notifying a user of atmospheric condition changes, said computer program product comprising:

means for retrieving a first value using a computer system, the first value corresponding to a first altitude of an aircraft;

means for retrieving a second value using the computer system, the second value corresponding to a second altitude of the aircraft, wherein the second value is a calculated pressure that is calculated using a true altitude and wherein the first value is a barometric pressure used for calculating the first altitude;

means for computing a value change using the first value and the second value; and means for notifying the user in response to the value change.

22. The computer program product as described in claim 21 wherein calculating the calculated pressure further comprises:

means for receiving the true altitude from a GPS device;

means for receiving an altimeter altitude from an altimeter;

means for retrieving a fixed reference pressure;

means for performing the calculating using the true altitude, the altimeter altitude, and the fixed reference pressure.

23. The computer program product as described in claim 21 further comprising:

means for receiving a user request from the user; and means for displaying alternative flight information corresponding to the user request.

24. The computer program product as described in claim 23 wherein the alternative flight information is selected from the group consisting of an airport location and an alternative flight pattern.

25. The computer program product as described in claim 21 wherein the notifying is performed using an audio signal.

26. The computer program product as described in claim 21 wherein the notifying includes displaying one or more altitude values, wherein at least one of the altitude values are selected from the group consisting of the true altitude, an altimeter altitude, the calculated pressure, a pressure change, and an altitude change.

27. The computer program product as described in claim 21 wherein the means for computing the value change includes means for computing a rate of change of a difference between the first value and the second value.

28. A computer program product stored on a computer operable media for notifying a user of atmospheric condition changes, said computer program product comprising:

means for retrieving a first value using a computer system, the first value corresponding to a first altitude of an aircraft;

means for retrieving a second value using the computer system, the second value corresponding to a second altitude of the aircraft;

means for computing an altitude change using the first value and the second value;

means for retrieving an aircraft speed;

means for retrieving one or more user preferences;

means for determining whether to display a notification message to the user based upon the altitude change, the aircraft speed, and at least one of the user preferences; and means for notifying the user, wherein the notifying includes displaying a notification message in response to the determination.

29. The computer program product as described in claim 28 wherein the notification message is selected from the group consisting of a warning message and an alert message.

30. The computer program product as described in claim 28 wherein the first value is a true altitude that is received from a GPS device and wherein the second value is an altimeter altitude that is received from an altimeter.

* * * * *

UNITED STATES PATENT AND TRADEMARK OFFICE
CERTIFICATE OF CORRECTION

PATENT NO. : 6,917,297 B2
DATED : July 12, 2005
INVENTOR(S) : Andrews et al.

It is certified that error appears in the above-identified patent and that said Letters Patent is hereby corrected as shown below:

Column 12,
Line 6, please delete "(decision 890) For" and insert -- (decision 890). For --.

Column 16,
Line 4, please delete "of a the" and insert -- of the --.
Line 42, please delete "OPS" and insert -- GPS --.

Signed and Sealed this

Fourth Day of October , 2005

JON W. DUDAS
*Director of the United States Patent and Trademark Office*